July 7, 1970  J. B. EDWARDS  3,519,794
LIGHTER PLUG UNIT
Filed June 26, 1968

INVENTOR
Jones B. Edwards

United States Patent Office 3,519,794
Patented July 7, 1970

3,519,794
LIGHTER PLUG UNIT
Jones Burnett Edwards, 1923 Woodcrest Ave., Apt. 6,
Charlotte, N.C. 28203
Filed June 26, 1968, Ser. No. 740,170
Int. Cl. F23g 7/22
U.S. Cl. 219—267                            10 Claims

ABSTRACT OF THE DISCLOSURE

An electric lighter plug unit for an electric popout cigarette lighter received and stored in a socket or holding device, and generally used in automobiles.

---

A plug core has at the forward or lower end a conventional heating coil, contained in a contact cup, on a long rivet, a ceramic spacer, a washer with slots, and a spring retainer, all mounted on the rivet, which is upset at the end to hold the parts together as an assembly, which also includes a spring, and has a cap carrying an operational knob affixed to the rearward end of the retainer. The spring retainer has a plurality of slots about the periphery of its side wall at the base portion registering with the washer slots, and at its open rearward end is a flange. A combination telescoping guard sleeve which is also the plug case surrounds the plug core and about the periphery of its side wall a plurality of inturned fingers engage the slots in the spring retainer and the washer. The spring surrounds the retainer and is disposed between the washer and the flange, which also align the plug core within the guard sleeve.

In storage and use positions the forward or lower end of the spring is supported on the edge of the washer while the rearward or upper end of the spring rests on the flange, both of which are parts of the plug core. Only when the plug core is operated forward is the forward end of the spring supported just by the inturned fingers of the guard sleeve slidable in the slots aforesaid.

This construction differs quite substantially from that of other popout lighters in which the forward end of the spring is always supported by a fixed part of the plug core or shell. The present unique arrangement and design of parts also results in several other advantageous features fully described hereinafter. The plug unit may be grasped by the guard sleeve instead of the mounting cup when attaching and detaching the operational knob.

Due to the improved construction using the telescoping guard sleeve-plug case, the sleeve is slidable axially on parts of and with respect to the plug core, automatically extending beyond the heating coil to form an effective ash guard when the plug unit is removed from the socket for use in lighting a cigarette, and automatically retracting to storage position when the plug unit is returned to the socket. As used herein forward, lower, bottom and inner are synonymous, and rearward, upper, top and outer are synonymous.

This invention relates to the plug unit of electric cigar and cigarette lighters commonly used in automobiles which comprise a socket or holding device having a thermostatic latch, and a plug unit having a heating coil on the end which is normally stored in the socket. When depressed the plug unit, which is spring loaded, makes electrical contact and is held by the thermostatic latch until a heating coil is heated through the electrical circuit established. Then, responsive to the heat, the thermostatic latch releases the spring-urged plug unit which partially pops out and is ready to be removed for use in lighting a cigar or cigarette.

The most widely used such lighter has an extensible or telescoping guard sleeve surrounding but exposing the heating coil, which is extended beyond the heating coil when the plug unit is removed from the socket for use in lighting a cigarette, forming a cup for catching ashes or embers of tobacco which might otherwise fall on clothing or upholstery during the lighting operation. When the plug unit is re-inserted in the socket after use, the guard sleeve slides back with its end exposing the heating coil. The telescoping action of the guard sleeve is automatic with removal and insertion of the plug unit. The basic construction and arrangement of parts of a conventional and commonly used lighter of the type mentioned is more fully described in U.S. Pat. No. 2,727,977, granted Dec. 20, 1955, to L. E. Fenn, to which reference is made.

It is a principal object of the present invention to provide improved and novel arrangements of parts in a lighter plug unit which retains all of the advantages of current lighters.

Another prime object of the invention is to eliminate one or more parts of conventional plug units and simplify assembly operations, without sacrifice of any function or operational feature of current lighters, thus reducing the cost of manufacture of lighter plug units. As standard equipment on new automobiles, millions of lighters are made each year, and elimination of even a few cents per unit cost would represent a worthwhile saving.

A further object of the invention is to provide the improved lighter plug unit with a telescoping guard sleeve, which may be used in current lighter sockets without requiring any changes therein.

Other features and advantages will appear hereinafter as structural details of the invention are disclosed and described.

Figure 1:
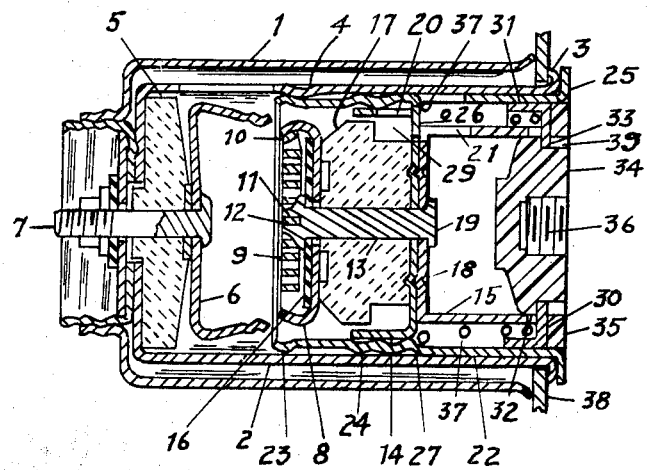
FIG. 1 is an axial sectional view of a cigarette lighter having an improved plug unit, with a sleeve extensible beyond the heating coil element, made according to the present invention, the parts being shown in open-circuit or storage position.
Figure 4:
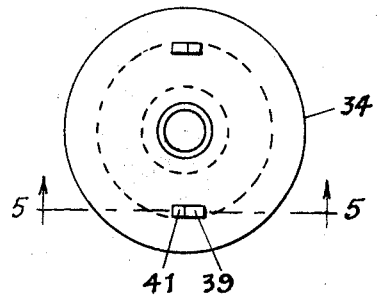
FIG. 4 is a top plan view of the cap to which a handle or knob may be affixed, showing the openings that facilitate attachment of the cap to the plug core.

A lighter of the type to which the present invention relates consists of two principal and cooperative units, a socket 2 held in place on an instrument panel of a conveyance by a clamping sleeve 1, and a plug unit represented by sleeve 22 and the plug core parts assembled within it. The socket 2 carries a thermostatic latch member 6 mounted on stud 7, and the plug unit carries a heating coil 9 housed in a contact cup 8.

Figure 2:
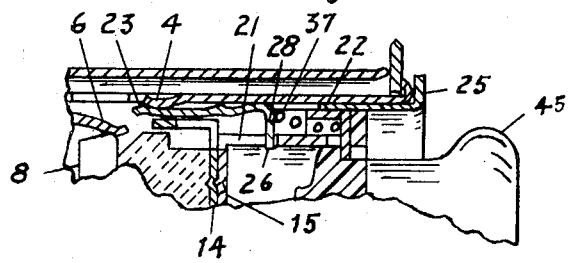
FIG. 2 is a fragmentary view like FIG. 1, with the parts shown in energizing or operated position.

Normally the plug unit is stored in socket 2 with the thermostatic latch 6 and contact cup 8 out of engagement, as shown in FIG. 1. In operation, contact cup 8 is engaged and held by prongs of thermostatic latch 6 as shown in FIG. 2, and an electrical circuit established in heating coil 9 by this engagement heats the coil. Heat from the coil causes expansion of the said prongs of the said latch member 6, and the plug unit is released and partially "pops-out" under urging by coil spring 37, as shown in FIG. 3.

Since the present invention relates principally to an improved plug unit above identified, the specification which follows will be concerned with its construction and arrangement of parts, except where cooperative features of the socket unit makes their inclusion necessary to complete understanding.

The improved plug unit consists of a tubular member which is a combined extensible guard sleeve 22 and plug unit case. Within sleeve 22 are mounted the parts comprising the plug core. Heating coil 9 is mounted in a contact cup 8, one end of the coil being welded to the inside of cup 8 as at 10, the other end 11 of coil 9 being lodged in a slot 12 in the end of a long rivet 13. Electrical insulation 16 isolates rivet 13 from contact with cup 8 as it passes through an enlarged opening in cup 8, as shown in FIG. 1.

Figure 3:
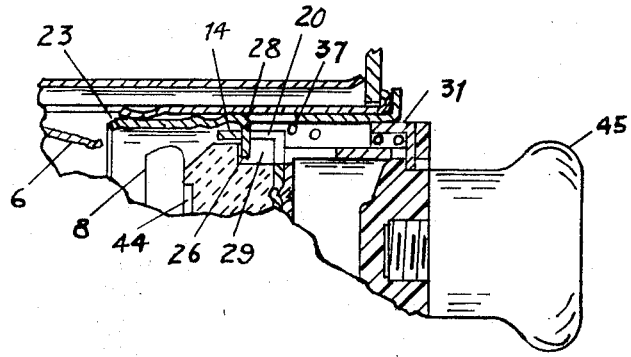
FIG. 3 is a fragmentary view like FIGS. 1 and 2, with the plug unit partially out of the socket, the parts showing the extensible sleeve extended beyond the heating coil.

A ceramic spacer 17 is mounted on rivet 13 between cup 8 and a washer 14 (which is preferably skirted as indicated by 14 in FIG. 3, and as shown in FIGS. 1 and 2). A tubular member with one end closed serves as a spring retainer 15, and is also mounted on rivet 13, the end of which is upset as at 19. The spring retainer 15 has a turned flange 30 with a skirt portion 31 at the upper or outer end and when assembled coil spring 37 is confined between washer 14 and flange 30 on retainer 15.

Figure 5:
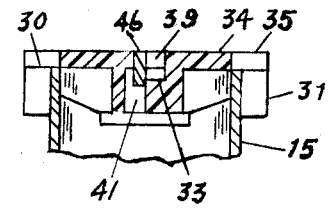
FIG. 5 is a sectional elevation view along the line 5—5 of FIG. 4, showing the cap in place on the plug core and secured by a small wedge.

A heat-resisting cap 34, which may be of molded plastic, has offset openings 39 and 41, and retainer 15 has inturned lugs 33 punched from the wall of retainer 15 as at 32. Lugs 33 enter openings 41 when cap 34 is put in place, and as cap 34 is turned lugs 33 rest on bottom or lands of openings 39, affecting fastening cap 34 to retainer 15 where it is held by wedge 46, FIG. 5. Rim 35 of cap 34 bears on flange 30. Cap 34 has a threaded hole 36 into which an operating knob 45 may be screwed.

Retainer 15 and the washer 14 have registering slots 21 and 20, respectively, which are held in alignment by indentations 18 in retainer 15, washer 14 and spacer 17. Spacer 17 has slots 29 or an equivalent channel registering with slots 20 and 21. The said slots may be one, two or three in number equally spaced about the periphery of the designated parts.

Guard sleeve 22 has one or more inturned fingers 26, which project into slots 20 and 21 and are axially slidable therein. Fingers 26 may have shoulders 28 to assist maintenance of alignment of the core when sleeve 22 is extended as in FIG. 3. Guard sleeve 22 also lower bead 23 and upper bead 24, which are engaged by lanced fingers 4 on the wall of socket 2, when the plug unit is fully inserted in the socket. Socket 2 has a flange 3 resting against the front of the instrument panel 38, and guard sleeve 22 has a flange 25 resting on flange 3.

Assembly of the improved plug unit is accomplished in two principal stages. The cup 8, heating coil 9, insulating washer 16 are assembled with rivet 13. Spacer 17 and washer 14 are put on rivet 13, guard sleeve 22 is put in place with inturned fingers 26 in slot 20 of washer 14, spring 37 is placed inside of guard sleeve 22, retainer 15 is put on rivet 13 with slots 21 registering with slots 20, and rivet 13 is upset as at 19. Cap 34 then may be affixed.

Figure 6:
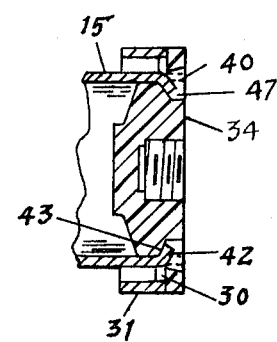
FIG. 6 is a fragmentary axial sectional view similar to parts of FIGS. 1, 2 and 3, showing a modified means of fastening the cap to the plug core.

An alternate manner of attaching cap 34 is shown in FIG. 6. Openings 47 in cap 34 have slopes 43. Lugs 40 are punched on the end of retainer 15 as at 30 and cleated at slopes 43, effectively holding cap 34 in place. Rim 35 of cap 34 bears on flange 30, FIG. 6.

The lighter is operated by depressing knob 45 which moves the plug core with cup 8 into engagement with and detention by prongs of latch member 6, this inward travel of the core being limited by fingers 26 in slots 21. This action compresses spring 37 between fingers 26 and flange 30, FIG. 2. Stud 7 on which latch member 6 is mounted is connected to an ungrounded terminal having connection with one pole of a source of electricity. Contact between latch member 6 and cup 8 establishes an electrical circuit through coil 9, rivet 13, washer 14, retainer 15, spring 37, fingers 26, sleeve 22, fingers 4 of socket 2, and grounded at instrument panel 38 having connection with the other pole of the said source of electricity.

When heat causes the prongs of thermostatic latch member 6 to expand, cup 8 is released and under urging of compressed spring 37 the core partially "pops-out," FIG. 3. When the plug unit is removed for lighting a cigarette or cigar the core pulls out to its limit of travel of fingers 26 in slots 20, sleeve 22 being detained by fingers 4 and bead 23 on sleeve 22 until this limitation is reached. Hence, when the plug unit has been fully removed from the socket 2, the inner edge of sleeve 22 is in an extended forward position forming a shield surrounding cup 8 for keeping ashes and embers of tobacco from dropping on clothing or upholstery, FIG. 3. One or more lanced fingers 27 in the wall of sleeve 22 apply light friction against skirt portion of washer 14, holding sleeve 22 in extended position while the plug unit is being used in the lighting operation.

Upon re-insertion of the plug unit in socket 2, bead 23 encounters fingers 4 and spring 37 being stronger than this resistance and that of finger 27 against skirt of washer 14, sleeve 22 telescopes rearward until flange 25 seats against flange 3 and the plug unit is in storage position, FIG. 1. Herein the heating coil is said to be exposed when the plug unit is in either storage or energizing position.

From the foregoing description it will be understood that the movements of sleeve 22 axially of the core are entirely automatic both forward and rearward with insertion of the plug unit in the socket 2 and its removal therefrom. However, the position of sleeve 22 may also be shifted axially directly and independently of socket 2.

This plug unit construction and unique arrangement of parts eliminate a contact ring and sliding electrical contact of conventional pop-out lighters, and without any additional structural provisions, and without the core turning, the knob 45 may be screwed into cap 34 by holding the outside of the plug unit (sleeve 22) in the hand. In conventional pop-out lighters the core must be held against turning by grasping cup 8 when tightening the knob. Using the manual operation of the "bayonet" fastening for affixing cap 34 to retainer member 15, assembly of the improved plug unit is reduced to one mechanical or machine operation—upsetting rivet 13.

In lieu of other methods described for fastening cap 34 to retainer member 15, springy inturned fingers may be provided on retainer member 15 to engage lands in channels in cap 34, and when cap 34 is inserted in the end of retainer member 15, the springy fingers are first depressed then spring out to engage the lands in cap 34, preventing its removal. The sides of the channels in retainer member 15 prevent the assembly from turning. This is a well known type of fastening.

Variations and modifications may be made within the scope of the claims and portions of the improvements may be used without others.

I claim:

1. An electric lighter plug unit adapted to be received, stored and energized in a socket and removed therefrom for use in lighting cigarettes and cigars, comprising a heating coil mounted in a contact cup and on a rivet; also mounted on said rivet and forming a plug core assembly, a spacer, a spring retainer, washer means between said spacer and said retainer for aligning said assembly; a spring, flange means at the rearward end of said retainer for aligning said assembly, cap means affixed to the rearward end of said retainer and a knob attached to said cap means for operating the plug unit, said spring surrounding said retainer and disposed between said washer means and said flange means, a plurality of slots about the periphery of the side wall of said retainer and in said washer means; an extensible guard sleeve surrounding said assembly, forming a plug unit, and having a plurality of inturned fingers about the periphery of its side wall engaging said slots; said guard sleeve slidable axially on said washer means and said flange means with respect to said assembly to a forwardly extended ash-catching and use position enclosing the sides and projecting forward beyond the face of said heating coil, the ends of said spring bearing upon said washer means and said flange means in use and storage positions; said assembly movable forward beyond said storage position to an energizing position in which the heating coil is forward of the end of said guard sleeve and the forward end of said spring under tension bears upon said inturned fingers about the side wall of said guard sleeve; said inturned fingers in said slots limiting movement of said guard sleeve and said assembly to said positions, and yieldable friction means operable on said guard sleeve and said washer means for yieldably holding said guard sleeve in either of said positions in which it is put, both the movement limitations and said friction means for enabling said guard sleeve to be moved between said positions in response to solely axial force applied to said guard sleeve.

2. The invention as defined in claim 1, including a socket slidably receiving said plug unit, a bead on the forward portion of said guard sleeve, lanced fingers in the wall of said socket frictionally engaging said bead when said plug unit is in storage position and automatically shifting said guard sleeve to a forward ash-catching position beyond the face of and surrounding said heating coil when said plug unit is removed from said socket and rearward to expose said heating coil when said plug unit is inserted in said socket and returned to storage position.

3. The invention as defined in claim 1, including cooperating interlocking means between said washer means and said retainer for maintaining alignment of the slots in said washer means and said retainer against turning when said plug unit is held by said guard sleeve while attaching and detaching said knob.

4. The invention as defined in claim 2, including cooperating interlocking means between said washer means and said retainer for maintaining alignment of the slots in said washer means and said retainer against turning when said plug unit is held by said guard sleeve while attaching and detaching said knob.

5. The invention as defined in claim 3, in which said friction means is a lanced finger in the wall of the guard sleeve which exerts light friction against said washer means for yieldably holding said guard sleeve when in extended position for use in lighting a cigarette, and for yieldably holding said assembly in storage position without interfering with the operation of said assembly when it is in energizing position.

6. The invention as defined in claim 4, in which said friction means is a lanced finger in the wall of the guard sleeve which exerts light friction against said washer means for yieldably holding said guard sleeve when in extended position for use in lighting a cigarette, and for yieldably holding said assembly in storage position without interfering with the operation of said assembly when it is in energizing position.

7. The invention as defined in claim 6, including inturned lugs at the rearward end of said retainer, top and bottom offset openings in said cap means and in which said inturned lugs enter said bottom offset openings and when said cap means is turned come to rest on the bottom of said top offset openings, and a rim on said cap means which bears on said flange means.

8. The invention as defined in claim 6, including lugs on the rearward end of said retainer, openings in said cap means through which said lugs pass, slopes in said openings against which said lugs are cleated to securely fasten said cap means to said retainer, and a rim on said cap means which bears on said flange means.

9. The invention as defined in claim 6, in which said lanced fingers in said socket frictionally bear on said guard sleeve and said bead, and said lanced finger on said guard sleeve frictionally bears on said washer means, said spring being stronger when not compressed by operation than the friction affecting said guard sleeve.

10. The invention as defined in claim 7, including a wedge in a top offset opening in said cap means for preventing turning of said cap means on said retainer.

References Cited

UNITED STATES PATENTS

| | | | |
|---|---|---|---|
| 2,727,977 | 12/1955 | Fenn | 219—267 |
| 3,040,160 | 6/1962 | Gaudet et al. | 219—267 |
| 3,088,015 | 4/1963 | Cone et al. | 219—267 |

VOLODYMYR Y. MAYEWSKY, Primary Examiner

U.S. Cl. X.R.

219—265, 270